United States Patent Office 3,071,583
Patented Jan. 1, 1963

3,071,583
POLYENE ALDEHYDE DERIVATIVES OF
RHODANINES
Balthasar Hegedus, Binningen, Switzerland, assignor to Hoffmann-La Roche Inc., Nutley, N.J., a corporation of New Jersey
No Drawing. Filed Nov. 15, 1960, Ser. No. 69,291
Claims priority, application Switzerland Nov. 20, 1959
8 Claims. (Cl. 260—240)

The present invention relates to a procedure for the preparation of novel, intensely colored derivatives of polyene aldehydes, particularly of such aldehydes which contain more than two unsaturated linkages.

The processes of the invention comprise reacting a polyene aldehyde containing at least two unsaturated linkages with a rhodanine of the formula $$\begin{array}{c} H_2C \!-\!\!-\!\!-\! S \\ | \quad\quad\; | \\ O\!=\!C \quad C\!=\!S \\ \diagdown\; \diagup \\ N \\ | \\ R_1 \end{array} \quad (I)$$

wherein the symbol $R_1$ represents hydrogen, alkyl, aryl or aralkyl. Preferably, $R_1$ represents hydrogen, lower alkyl (such as methyl or ethyl), phenyl or benzyl.

Suitable starting materials for the process of the invention include, for example, polyene aldehydes of the formula $$R_2\!-\!CH\!=\!\underset{\underset{CH_3}{|}}{C}\!-\!\Big[CH\!=\!CH\Big]_m\!-\!\Big[CH\!=\!CH\!-\!CH\!=\!\underset{\underset{CH_3}{|}}{C}\Big]_n\!-\!CHO \quad (II)$$

wherein $R_2$ represents a hydrocarbon radical having the carbon skeleton of geraniol or cyclogeraniol; and the symbols $m$ and $n$ represent the numbers 0 or 1, at most one of these symbols being 1.

As representative examples of such aldehydes, the following compounds can be mentioned:

2-methyl-4-(2,6,6-trimethyl-1-cyclohexen-1-yl)-2-buten-1-al.
2-methyl-4-(2,6,6-trimethyl-2-cyclohexen-1-ylidene)-2-buten-1-al.
2-methyl-4-(2,6,6-trimethyl-1,3-cyclohexadien-1-yl)-2-buten-1-al.
2-methyl-4-(2,6,6-trimethyl-1-cyclohexylidene)-2-buten-1-al.
2,6,10-trimethyl-2,4,9-undecatrien-1-al.
4-methyl-6-(2,6,6-trimethyl-1-cyclohexen-1-yl)-2,4-hexadien-1-al.
4-methyl-6-(2,6,6-trimethyl-1-cyclohexylidene)-2,4-hexadien-1-al.
2,6-dimethyl-8-(2,6,6-trimethyl-2-cyclohexen-1-ylidene)-2,4,6-octatrien-1-al.
2,6-dimethyl-8-(2,6,6-trimethyl-1-cyclohexylidene)-2,4,6-octatrien-1-al.

An additional group of compounds especially suited as starting materials for the processes of the invention are aldehydes of the formula (III)

wherein the bond indicated by dots may optionally be hydrogenated, the symbol $m$ represents a whole number from 0 to 3 and the symbol $n$ represents 0 or 1, the sum of $m$ and $n$ being at least 1.

Exemplary of suitable compounds of the above formula are such polyene aldehydes as:

4,9,13-trimethyl-15-(2,6,6-trimethyl-1-cyclohexen-1-yl)-2,4,8,10,12,14-pentadecahexaen-6-yn-1-al.
2,6,11,15-tetramethyl-17-(2,6,6-trimethyl-1-cyclohexen-1-yl)-2,4,6,8,10,12,14,16-heptadecaoctaen-1-al.
4,8,13,17-tetramethyl-19-(2,6,6-trimethyl-1-cyclohexen-1-yl)-2,4,6,8,12,14,16,18-nonadecaoctaen-10-yn-1-al.
2,6,10,15,19-pentamethyl-21-(2,6,6-trimethyl-1-cyclohexen-1-yl)-2,4,6,8,10,12,14,16,18,20-heneicosadecaen-1-al.
4,8,12,17,21-pentamethyl-23-(2,6,6-trimethyl-1-cyclohexen-1-yl)-2,4,6,8,10,12,14,16,18,20,22-tricosaundecaen-1-al.
2,6,10,14,19,23-hexamethyl-25-(2,6,6-trimethyl-1-cyclohexen-1-yl) 2,4,6,8,10,12,14,16,18,20,22,24-pentacosadodecaen-1-al.

Finally, vitamin-A-aldehyde, and derivatives thereof which have the same carbon skeleton, can be employed as starting materials. In all of the above mentioned polyene aldehydes, the double bonds can be replaced in part by triple bonds.

Representative of rhodanine compounds suitable as starting materials for the process of the invention are, for example, compounds of Formula I above in which the symbol R represents hydrogen, phenyl, methyl or benzyl.

The reaction of the polyene aldehyde reactant with the rhodanine reactant is advantageously effected in a water-miscible solvent, e.g. alcohol or dioxan, in the presence of ammonia or a low molecular weight organic base, e.g. diethylamine, diethanolamine or triethylamine. In order to obtain good yields, it has been found desirable to include water in the reaction mixture. A further increase in yield can be obtained by addition of ammonium chloride.

The new polyene derivatives obtained by the processes of the invention can be represented collectively by the formula $$\begin{array}{c} R_4\!=\!C \!-\!\!-\!\!-\! S \\ | \quad\quad\; | \\ O\!=\!C \quad C\!=\!S \\ \diagdown\; \diagup \\ N \\ | \\ R_1 \end{array}$$

wherein the symbol $R_1$ represents hydrogen, alkyl, aryl, or aralkyl (preferably hydrogen, lower alkyl, phenyl or benzyl); and $R_4$ represents the residue remaining after removal of the oxygen atom of the aldehyde employed.

These derivatives are characterized by their especially intense coloring effect, and are useful as coloring agents in the foodstuff, feedstuff and cosmetic industries. Additionally they can be employed as antifungal agents.

The invention is further disclosed in the following examples, which are illustrative, but not limitative, thereof:

Example 1

2.84 g. of 3,7-dimethyl-9-(2,6,6-trimethyl-1-cyclohexen-1-yl)-2,4,6,8-nonatetraen-1-al is refluxed for two hours with 1.33 g. of rhodanine in a mixture of 95 ml. of alcohol and 5 ml. of concentrated ammonia with addition of a solution of 0.1 g. of ammonium chloride in 1 ml. of water. The reaction mixture is allowed to cool to room temperature and the precipitate which forms is filtered off, and washed with alcohol, ether and petroleum ether. In this way, there is obtained 3,7-dimethyl-9-(2,6,6-trimethyl-1-cyclohexen-1-yl)-1-[thiazol-4(5H)-one - 2(3H)-thion-5-ylidene]-2,4,6,8-nonatetraene, of M.P. 216–217° which is colored black-violet.

Example 2

When employing 2-methyl-4-(2,6,6-trimethyl-1-cyclohexen-1-yl)-2-buten-1-al as the polyene aldehyde, but otherwise under the same conditions as in Example 1, there is obtained, after washing the filter residue with alcohol and petroleum ether, 2-methyl-4-(2,6,6-trimethyl-1-cyclohexen-1-yl)-1-[thiazol-4(5H)-one-2(3H) - thion-5-ylidene]-2-butene, of M.P. 140–142°, which is colored light orange.

Example 3

Starting from 2,6-dimethyl-8-(2,6,6-trimethyl-2-cyclohexen-1-yl)-2,4,6-octatrien-1-al, there is obtained, by proceeding as indicated in Example 1, 2,6-dimethyl-8-(2,6,6-trimethyl-1-cyclohexen-1-yl)-1-[thiazol-4(5H) - one - 2(3H)-thion-5-ylidene]-2,4,6-octatriene, of M.P. 204–206°, which is colored orange-red.

Example 4

Starting from 2,6-dimethyl-8-(2,6,6-trimethyl-2-cyclohexen-1-ylidene)-2,4,6-octatrien-1-al, there is obtained, by proceeding according to the indications in Example 1, 2,6-dimethyl-8-(2,6,6-trimethyl-2-cyclohexen-1 - ylidene)-1-[thiazol-4(5H)-one-2-(3H)-thion-5-ylidene]-2,4,6 - octatriene, of M.P. 224–226°, which is black-violet in color.

Example 5

Starting from 4,9,13-trimethyl-15-(2,6,6-trimethyl-1-cyclohexen-1-yl)-2,4,8,10,12,14 - pentadecahexaen-6-yn-1-al, there is obtained, by proceeding according to the indications in Example 1, 4,9,13-trimethyl-15-(2,6,6-trimethyl-1-cyclohexen-1-yl)-1-[triazol-4(5H)-one - 2(3H)-thion-5-ylidene]-2,4,8,10,12,14-pentadecahexaen - 6 - yne, of M.P. 210–211°, which is colored deep violet-red.

Example 6

Starting from 2,6,11,15-tetramethyl-17-(2,6,6-trimethyl-1-cyclohexen-1-yl) - 2,4,6,8,10,12,14,16 - heptadecaoctaen-1-al, there is obtained, according to the indications in Example 1, 2,6,11,15-tetramethyl-17-(2,6,6-trimethyl-1-cyclohexen-1-yl)-1-[thiazol-4(5H)-one - 2(3H) - thion-5-ylidene]-2,4,6,8,10,12,14,16-heptadecaoctaene, of M.P. 184–185°, which is colored deep red-violet.

I claim:

1. A compound of the formula

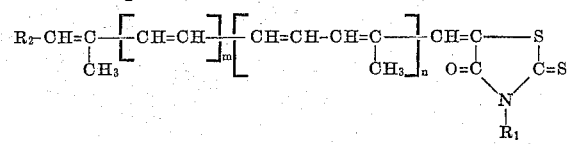

wherein $R_1$ represents a member selected from the group consisting of hydrogen, lower alkyl, phenyl and benzyl, $R_2$ represents a hydrocarbon radical having the carbon skeleton of a member selected from the group consisting of geraniol and cyclogeraniol and each of $m$ and $n$ represents a number from 0 to 1, at most one of $m$ and $n$ being 1.

2. A compound of the formula

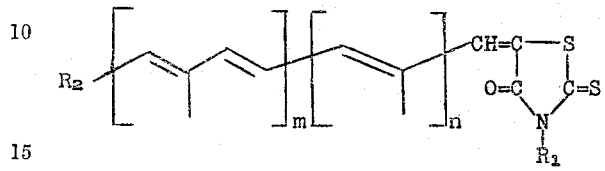

wherein $R_1$ represents a member selected from the group consisting of hydrogen, lower alkyl, phenyl, and benzyl; $R_2$ represents a member selected from the group consisting of

and

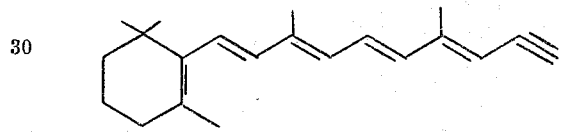

$m$ represents a member from 0 to 3; and $n$ represents a member from 0 to 1, the sum of $m$ and $n$ being at least 1.

3. 3,7-dimethyl-9-(2,6,6-trimethyl-1-cyclohexen-1-yl)-1-[thiazol-4-(5H)-one-2-(3H)-thion-5-ylidene] - 2,4,6,8-nonatetraene.

4. 2-methyl-4-(2,6,6-trimethyl-1-cyclohexen - 1 - yl)-1-[thiazol-4(5H)-one-2(3H)-thion-5-ylidene]-2-butene.

5. 2,6-dimethyl-8-(2,6,6-trimethyl-1-cyclohexen1 - yl)-1-[thiazol-4(5H)-one-2(3H)-thion-5-ylidene] - 2,4,6-octatriene.

6. 2,6-dimethyl-8-(2,6,6-trimethyl-2-cyclohexen-1-ylidene)-1-[thiazol-4(5H)-one-2(3H)-thion-5-ylidene] - 2,4,6-octatriene.

7. 4,9,13-trimethyl-15-(2,6,6-trimethyl-1-cyclohexen-1-yl)-1-[thiazol-4(5H)-one-2(3H)thion-5-ylidene] - 2,4,8,10,12,14-pentadecahexaen-6-yne.

8. 2,6,11,15-tetramethyl-17-(2,6,6 - trimethyl-1-cyclohexen-1-yl)-1-[thiazol-4(5H)-one-2(3H)-thion - 5 - ylidene]-2,4,6,8,10,12,14,16-heptadecaoctaene.

References Cited in the file of this patent

UNITED STATES PATENTS

| | | |
|---|---|---|
| 2,907,761 | Benton | Oct. 6, 1959 |
| 2,990,430 | Stern | July 27, 1961 |

OTHER REFERENCES

Turkevich et al.: Ukrain. Khim. Zhur., vol. 16, pages 558 to 562 (1950).

Brown et al.: Industrial and Engineering Chemistry, vol. 46, pages 1508–12 (1954).

Richter et al.: Journ. für Prakt. Chem., vol. 7 (4th series), pages 184–90 (1958).

Ried et al.: Annalen der Chemie, vol. 622, pages 37–42 (1959).